United States Patent [19]

Yoshida

[11] Patent Number: 5,288,402
[45] Date of Patent: Feb. 22, 1994

[54] LIQUID FILTER MEDIUM INCLUDING A FIBRILLATED FILTERING LAYER AND AN ORGANIC FIBER SUPPORT

[75] Inventor: Mitsuo Yoshida, Tokyo, Japan

[73] Assignee: Mitsubishi Paper Mills Limited, Tokyo, Japan

[21] Appl. No.: 966,537

[22] Filed: Oct. 26, 1992

[51] Int. Cl.$^5$ .............................................. B01D 39/16
[52] U.S. Cl. ................................... 210/488; 210/491; 55/486; 55/524; 55/DIG. 5
[58] Field of Search ............... 210/488, 489, 490, 506, 210/508, 491, 503, 505; 55/524, DIG. 5, DIG. 42, 486, 527

[56] References Cited

U.S. PATENT DOCUMENTS 5,089,075  2/1992  Sonoda ........................ 29/DIG. 47

FOREIGN PATENT DOCUMENTS 0375234     6/1990   European Pat. Off. .
59-92011    5/1984   Japan .
61-268321  11/1986   Japan .
61-268325  11/1986   Japan .
61-275495  12/1986   Japan .
3-12208     1/1991   Japan .
WO91/16119 10/1991   PCT Int'l Appl. .

Primary Examiner—Robert A. Dawson
Assistant Examiner—W. L. Walker
Attorney, Agent, or Firm—Finnegan, Henderson, Farabow, Garrett & Dunner

[57] ABSTRACT

A two-layered filter medium for liquid filtration comprises a support composed of organic fibers of 7 μm or more in diameter and basis weight of 30–150 g/m$^2$, and a filtering layer composed of three kinds of organic fibers different in diameter, a part or all of the kind of organic fibers having the largest diameter being a fibrous organic binder.

4 Claims, No Drawings

LIQUID FILTER MEDIUM INCLUDING A FIBRILLATED FILTERING LAYER AND AN ORGANIC FIBER SUPPORT

BACKGROUND OF THE INVENTION

1. Field of the Invention

The present invention relates to a filter medium, more particularly, to a filter medium for liquid filtration to remove waste solid contained in processing liquor of an electric discharge metal engraving or cutting process or to remove waste particulate efficiently and to reclaim pure water from process water used for cutting, polishing and etching of a wafer for production of IC's where ultra-pure water is required, or more generally to a filter medium for internal combustion engine oil, fuel, or the like.

2. Description of the Related Art

Heretofore, there have been used a fiber integrity formed of mixture of natural pulp and synthetic fibers and impregnated with a phenolic resin or the like, polyester nonwoven fabrics (spunbond) and the like, as liquid filter medium for filtering liquor such as effluent of an electric discharge metal processing, process water of IC production, and oil or fuel for internal combustion engines. Any of those filter mediums is not satisfactory as its filtering efficiency is low and life short.

Conventional filter mediums generally function to trap particles inside the filter medium, and make use of relatively coarse filter materials in order to lengthen life, so that the aimed filtration efficiency can not be attained initially until particles have filled the filter pores to some extent. When the pores come to be filled with particles, pressure loss increases and the liquid f low resistance goes up, resulting in either short life or degradation of filtration efficiency as particles once trapped are released.

A high performance filter making use a porous sheet made of fluorocarbon resins or the like is known, but it is so expensive that its use is limited to certain particular fields only. Such sheet is not suitable for a filter that has to treat a large amount of liquid like in the case of process water of electric discharge metal engraving and of IC production.

In order to solve these problems, there have been developed a filter medium utilizing fibrillated synthetic fibers (Japanese Patent Application Laid-open No.92011/1984). However, such fibers are fine and when they alone are formed into a sheet according to an ordinary wet-laid method, it is inevitable that a great amount of them f low away through a wirecloth or they cause clogging of it. Even if a medium is dare to be prepared, it is a very dense due to use of the fine fibers alone and therefore, the filtration resistance is so high that the medium can not be practically used even though the filtering efficiency is high.

When monofilament fibers of a relatively large diameter are incorporated in a filter medium so as to lower the filtration resistance, the flow-away loss of the fine fibrillated fibers at the sheet forming step increases more than that as mentioned above, so that the sheet obtained tends to be coarse, filtering efficiency goes down to a great extent, and a sufficient performance can not be attained.

A two-layered filter medium having a density gradient along Z-direction is disclosed in Japanese Patent Application Laid-Open Nos.268321/1986, 268325/1986, and 275495/1986. This filter medium is composed of two filtering layers in combination differing in density so as to attain improved balance between filtration efficiency and filter life. This filter medium is fundamentally different from the filter medium of the present invention in which filtering function is performed by the surface of the medium (substantially by the filtering layer).

When the pores are filled with particles, the pressure loss increases, the liquid flow is disturbed and the filter life shortened, or the particles captured inside of the filter flow away resulting in low filtration efficiency.

SUMMARY OF THE INVENTION

An object of the present invention is to provide a filter medium capable of exhibiting at least partly a low filtration resistance, a high filtration efficiency and a good processibility.

According to the present invention, there is provided a filter medium for liquid filtration which comprises: a filtering layer (hereinafter called Filtering Layer) comprising 5-40% by weight of fibrillated synthetic fibers having a fiber diameter of 1 $\mu$m or less, 5-70% by weight of ultra-fine synthetic fibers having a fiber diameter of 1-5 $\mu$m, and 20-70% by weight of synthetic fibers having a fiber diameter of more than 5 $\mu$m, a part or all of the synthetic fibers having a fiber diameter of more than 5 $\mu$m being a fibrous organic binder, and having an average pore size of 1-10 $\mu$m and a basis weight of 5-50 g/m$^2$, and a support (hereinafter called "Support") comprising organic fibers having a fiber diameter of 7 $\mu$m or more and a basis weight of 30-150 g/m$^2$, and the Filtering Layer and the Support being put together and integrated on the sheet forming step.

DESCRIPTION OF THE PREFERRED EMBODIMENTS

The filter medium of the present invention comprises a high performance Filtering Layer which is thin but exhibits high particles trapping performance and a Support which allows high passage of liquid, has high strength and exhibits good folding processibility, the Filtering Layer and the Support being integrated on the sheet forming step.

The fibrillated synthetic fibers having a fiber diameter of 1 $\mu$m or less used in the Filtering Layer of the present invention may be prepared by the following exemplary suitable methods.

1) method where a solution of a synthetic high polymer flows down in an anti-solvent for the synthetic high polymer under shearing force and fiber-like fibrils precipitate (Fibrid method, Japanese Patent Publication No. 11851/1960).

2) Method for separating fibrils by polymerizing a synthetic monomer under shearing force (Polymerization-shearing method, Japanese Patent Publication No. 21898/1972).

3) Method comprising mixing two or more of incompatible high polymers, melt-extruding or spinning, cutting, and fibrillating by a mechanical means (Split method, Japanese Patent Publication No.9651/1960).

4) Method comprising mixing two or more of incompatible high polymers, melt-extruding or spinning, cutting, and soaking the cut pieces in a solvent so as to dissolving one high polymer and fibrillating (Polymer blend dissolving method, U.S. Pat. No. 3,382,305).

5) Method comprising ejecting explosively a synthetic high polymer solution at a temperature higher than the boiling point of the solvent from the high pressure side to the low pressure side to fibrillating the polymer (flush spinning method, Japanese Patent Publication No. 16460/1961).

6) Method comprising blending a polyester type high polymer and an alkali-soluble component incompatible with the polyester, molding the blend, decreasing weight by extracting the alkali-soluble component, and finally beating to form fibrils (Alkali-amount-reducing and beating method, Japanese Patent Publication No. 315/1981).

7) Method comprising cutting highly crystalline and highly oriented fibers such as Kevlar fibers and the like into an appropriate fiber length, dispersing the cut fibers in water, and fibrillating the fibers by means of a homogenizer, refiner or the like (Japanese Patent Application Laid-Open Nos. 100801/1981 and 92011/1984).

Particularly exemplary suitable fibrillated synthetic fibers include Kevlar fibers fibrillated by using a homogenizer such as MFC-400 (manufactured by Daicel Kagaku K.K.) and polyester pulp produced by Alkali-amount-reducing and beating method.

The content of the fibrillated synthetic fibers in the Filtering Layer is appropriately 5–40% by weight, preferably 5–30% by weight. When it is less than 5% by weight, the average pore size of the Filtering Layer becomes so large that a sufficient trapping performance is not attained. When the content exceeds 40% by weight, the filtration resistance becomes so high that the filter medium is not practical.

The ultra-fine synthetic fibers having a fiber diameter of 1–5 $\mu$m used in the Filtering Layer in the present invention may be, for example, polyester fibers, polyvinyl alcohol fibers, acrylic fibers and the like having a fiber diameter of 1–5 $\mu$m.

The content of the ultra-fine synthetic fibers is appropriately 5–70% by weight, preferably 10–60% by weight. When the content is less than 5% by weight, the amount of the fibers retained in the Filtering Layer becomes less as they tend to flow away through a wirecloth, and thereby a sufficient filtration efficiency is not attained, and moreover, there are problems in the production, for example, the sheet right after sheet formation can be hardly picked up from the wirecloth. When the content exceeds 70% by weight, the filtration resistance increases and thereby the filtration operation is not practical.

The organic fibers having a fiber diameter of more than 5 $\mu$m used for the Filtering Layer of the present invention may be synthetic fibers such as polyolefin, polyamide, polyester, acrylic resin, vinylon and the like, and pulp, linter, lint and derivatives thereof.

The fibrous organic binder may be a composite adhesive fiber (for example, of a sheath-core type) that shows little filming property and comprises as a 'core fiber' a high melting point polymer and as a 'sheath fiber' a low melting point polymer. The polymer to form the fibrous organic binder may be polyester, polyolefin, vinyl chloride-vinyl acetate copolymer and the like.

A kind of the fibrous binders composed of low melting point polymers alone (total melting type) or of polyvinyl alcohols (hot water soluble type) binders is liable to film during the step of drying the filter medium leading to increased filtration resistance, and therefore is not favored. However, as far as the characteristics of the Filtering Layer are not adversely affected, a fibrous binder of this kind may be also used.

The content of the organic fibers having a fiber diameter of more than 5 $\mu$m is 20–70% by weight of the Filtering Layer fiber furnish. Of these, fibrous organic binders constitute appropriately 20–60% by weight (based on the total amount of the various fibers in the Filtering Layer), preferably 30–50% by weight, of the fiber furnish.

When the content of the fibrous organic binder is less than 20% by weight, surface strength of the Filtering Layer is weak and the processing of the filter medium into a filter unit becomes difficult. On the other hand, when the content exceeds 60% by weight, the filtration resistance becomes so high that the Filtering Layer is hardly usable from a practical point of view.

With respect to content of the fibers having a diameter of more than 5 mm, when it exceeds 70% by weight, the average pore size of the sheet becomes so large that filtration efficiency of the medium becomes poor.

The basis weight of the Filtering Layer of the present invention is appropriately 5–50 g/m$^2$, preferably 10–30 g/m$^2$. When it is less than 5 g/m$^2$, there is a problem in terms of reliability due to pinholes and the like. When it exceeds 50 g/m$^2$, the filtration resistance increases and the sheet formation is difficult due to poor drainage, and no further increase in filtering efficiency is attained so that further increase in basis weight is unfavorable from the view point of costs.

Average pore size of the Filtering Layer is appropriately 1–10 $\mu$m, preferably 2–8 $\mu$m from the standpoint of filtration efficiency of the layer. When the average pore size is less than 1 mm, the filtration resistance goes up and flow of liquid goes down, so that such Filtering Layer is not preferable from a practical point of view. When the average pore size exceeds 10 $\mu$m, fine particles enter into inside of the filter medium and cause clogging resulting in a short filter life.

The maximum pore size is not particularly limited, but it is preferably 3 times the average pore size or less.

The Support according to the present invention is formed of 100% by weight of organic fibers having a fiber diameter of 7 $\mu$m or more. The fibers may be selected from synthetic fibers such as polyolefins, polyamides, polyesters, acrylic polymers, vinylon and the like. In addition, pulp, linter, lint and their derivatives may be used in combination, and fibrous organic binder formed of polymers like polyolefin, polyvinyl chloride, polyvinyl acetate may be added to Support fiber furnish.

Of synthetic fibers to be used in the Support fiber furnish, those having high fiber strength and good rigidness are preferable since they impart stiffness to the Support. In addition, those exhibiting little filming property and having a rod-like shape (cross section of which may be circle, oval, dumbbell, etc.) are preferable in order to prevent shortening of the filter life attributable to adhesion of fine particles which may enter into the Support.

As other fibers usable in the Support fiber furnish, there may be mentioned unbeaten natural pulp having little fibrillated component on fiber surface, linen pulp, regenerated cellulose and the like.

A kind of the fibrous binders composed of low melting point polymers alone (total melting type) or of polyvinyl alcohols (hot water soluble type) binders is liable to film during the step of drying leading to increased filtration resistance, and therefore is not favored. However, as far as the characteristics of the Support are not adversely affected, a fibrous binder of this kind may be also used.

The content of the fibrous organic binder in the Support fiber furnish is preferably 10-60% by weight. When the content is less than 10% by weight, there is not obtained a wet strength of the filter medium required later in the step of impregnating with a resin binder after the Support and Filtering Layer are formed and put together into a piece. When the content exceeds 60% by weight, there are a lot of films of a low melting point binder and the pressure loss of the filter medium increases resulting in the shortening the filter life.

As aforementioned, diameter of fibers for use in the Support fiber furnish is appropriately 7 μm or more. When the diameter is less than 7 μm, the filtration resistance of the Support increases and the liquid flow becomes poor. The upper limit of the fiber diameter is not particularly critical, but in view of the Support sheet forming step the fiber diameter is preferably 50 pm or less.

The basis weight of the Support of the present invention is appropriately 30-150 $g/m^2$, preferably 50-100 $g/m^2$. When it is less than 30 $g/m^2$, the folding processibility of the filter medium is poor. When it exceeds 150 $g/m^2$, the thickness of the Support increases so that there is a limitation in filtering area when the filter medium of the present invention is processed into a filter element and loaded into a filter unit, and the filtration resistance becomes undesirably high. Costs of the medium increases undesirably as well.

The filter medium of the present invention may be formed by a combination former in which two or more sheet formers for producing papers, paperboards and nonwoven fabrics, for example a Fourdrinier former, cylinder former, inclined former, are combined. Combination of type of the former may be of the same type or of different type.

In order to enhance strength property of the filter medium of the present invention, a variety of binders may be applied to the filter medium web. The binders may be latex of acrylic resins, polyvinyl acetate, epoxy resins, synthetic rubbers, polyvinylidene chloride or the like, polyvinyl alcohol, starch, phenolic resins or the like. These may be used alone or in combination.

If desired, other additives such as a water repelling agent, dispersing agent, retention aid, dye and the like may be added to said binder formulation unless characteristics of the filter medium are adversely affected.

The amount of the binders applied to the filter medium is appropriately 20% by weight or less based on the filter medium, preferably 15% by weight or less. When the binder amount exceeds 20% by weight, the filtering resistance of the filter medium becomes so high that it is not practically viable.

Although it is not desired to limit the present invention to any particular theory or mechanism, the reason why the filter medium of the present invention can attain simultaneously a high filtration efficiency and a long life may be explained as follows. The Filtering Layer comprises fibrillated synthetic fibers of 1 μm or less in diameter, ultra-fine synthetic fibers of 1-5 μm in diameter, and organic fibers of 5 μm or more in diameter in combination. This combination of the different kind of fibers inhibits aggregation of fine fibers having a diameter of 1 μm or less, resulting in good entanglement between the fibrillated synthetic fibers of 1 μm or less in diameter and ultra-fine synthetic fibers of 1-5 μm in diameter, formation of more uniform network which leads to homogeneous and fine pore size, and most desirable trapping of particles at the Filtering Layer. Since thickness of the Filtering Layer is thin, buildup of filtering resistance, after the medium has filtered extensive amount of liquor, is inhibited so that its life is long.

That is, it appears that from the beginning of the filtering operation, the filter medium exhibits a highly efficient filtration performance and the pores in the filter medium are not clogged with particles, and therefore, the filter life is long.

In addition, the Filtering Layer is integrated with the Support which gives little filtration resistance, maintains strength of the filter medium, and provides most desirable folding or other processibilities. Such favorable characteristics are by no means attainable by combining any filtering layer components alone.

The filter medium exhibits a high initial filtration efficiency from beginning of use, low filtering resistance buildup, a long filter life, and furthermore, a good processibility.

Therefore, for example, when the filter medium is used for removing abrasion or grinding dust, a machine does not suffer, and the number of changing the filter element required due to clogging can be decreased.

The filter medium of the present invention can efficiently remove particles contained in liquid, clarify and purify the liquid. The filter medium is favored, for instance, for removing efficiently dust contained in a process water of an electric discharge metal engraving machine, and of IC production where 'ultra-pure' water is required, and has to be reclaimed as well, for cutting, polishing, or etching wafers in the production of IC'S. In addition, the filter medium is favored for filtering oil or fuel for internal combustion engines, and for many other fields of use where liquid filtration is performed.

In the following, the present invention is explained referring to examples. The examples are given for illustration, but not for limitation of the present invention.

Pore size, basis weight, filtration resistance (evaluated in terms of filtration speed), and particle trapping ability in the following examples and comparative examples were evaluated by the following methods.

With respect to pore size of the Filtering Layer, the maximum pore size and average pore size were determined by the bubble point method and the average flow method according to With respect to filtration efficiency and filtration speed, powder of JIS, No. 8 type was dispersed in water to make solid concentration of to 0.05% by weight, and the liquor was used as a test liquid and the measurement was conducted as follows; Initial filtration efficiency:

A filter medium was wetted with water, and the test liquor (100 ml) was filtered by using the medium having a filtration area of 14 $cm^2$, at pressure loss, $\Delta P = 320 mmHg$. The number particles falling within 3-10 μm diameter range contained in the test liquor, before and after filtration, was counted by means of a liquor particulates counter (KL-01, manufactured by RION K.K.). The filtration efficiency (%) was determined by the following formula;

$$\frac{(a - b)}{a} \times 100$$

(where a = count before filtering, b = count after filtering) Initial filtration speed:

Filtration speed (cc/cm.min. ) was determined by calculation of measures of the above-mentioned filtration efficiency test. Life test:

After repeating filtration of the above-mentioned test liquor 10 times, the filtration efficiency and the filtration speed were measured in the same manner as in the above-mentioned test. Folding processibility test:

A sample specimen of filter medium was processed into an accordion fold. The processibility was evaluated and the result was marked with the following four signs.
⊚ Very good
○ Good
△ Somewhat poor
X Poor Dry strength This was measured according to JIS P 8113-1976, "Testing Method for Tensile Strength of Paper and Paperboard". Wet strength:

This was measured according to JIS P 8135-1976 "Testing Method of Wet Tensile Breaking Strength of Paper and Paperboard".

EXAMPLES 1-5

Kevlar fine fibers (MFC-400, manufactured by Daicel Kagaku K.K.), ultra-fine polyester fibers (manufactured by Asahi Kasei K.K., 0.1 denier ×3 mm, about 3 μm in diameter), polyester fibers (manufactured by Teijin K.K., 0.5 denier ×5 Mm, about 7 μm in diameter) and a thermalbonding (sheath-core type) polyester fibers (manufactured by Unitika Co., 4080, 2 denier ×5 mm, about 15 μm in diameter) were mixed to make kinds of fiber stock slurry for the Filtering Layer fiber furnish as shown in Table 1. The resulting stock slurry was formed into a Filtering Layer sheet of a basis weight of 20 g/m² using a standard square type hand sheet former.

A unbeaten NBKP (softwood bleached Kraft pulp), manufactured by Mitsubishi Paper Mills Ltd., polyester fibers (manufactured by Teijin K.K., 12 denier ×10 mm, about 35 μm in diameter), and thermal-bonding (sheath-core type) polyester fibers (manufactured by Unitika Co., 4080, 2 denier ×5 mm, about 15 μm in diameter) were mixed to make a fiber stock slurry for the Support fiber furnish as shown in Table 1. The resulting stock slurry was formed into a Support sheet of a basis weight of 80 g/m² using a standard square type hand sheet former.

Said Filtering Layer sheet and Support sheet, while they were wet, were put together, and then pressed and dried to form a filter medium sheet. The resulting sheet was applied with an anionic acryl-latex (Primal HA-16, manufactured by Nihon Acryl K.K.) in an amount of 5 g/m² by means of a size press and dried using an air drier to make each of filter mediums of Examples 1-5 as shown in Table 1. Characteristics and performance data of these Examples are summarized in Table 1.

EXAMPLE 6

Kevlar fine fibers (FMC-400, manufactured by Daicel Kagaku K.K.), ultra-fine polyester fibers (manufactured by Asahi Kasei K.K., 0.1 denier ×3 mm, about 3 μm in diameter), polyester fibers (manufactured by Teijin K.K., 0.5 denier ×5 mm, about 3 μm in diameter) and thermobonding (sheath-core type) polyester fibers (manufactured by Unitika Co., 4080, 2 denier ×5 mm, about 15 μm in diameter) were mixed to make a fiber stock slurry for the Filtering Layer fiber furnish as shown in Table 2. The resulting stock slurry was formed into a Filtering Layer sheet of a basis weight of 10 g/m² using a standard square type hand sheet former.

An unbeaten NBKP (softwood bleached Kraft pulp), manufactured by Mitsubishi Paper Mills Ltd., polyester fibers (manufactured by Teijin K.K., 12 denier ×10 mm, about 35 μm in diameter), and thermobonding (sheath-core type) polyester fibers (manufactured by Unitika Co., 4080, 2 denier ×5 mm, about 15 μm in diameter) were mixed to make a fiber stock slurry for the Support fiber furnish as shown in Table 2. The resulting stock slurry was formed into a Support sheet of a basis weight of 80 g/m² using a standard square type hand sheet former.

Said Filtering Layer sheet and Support sheet, while they were wet, were put together, and then pressed and dried to form a filter medium sheet. The resulting sheet was applied with an anionic acryl-latex (Primal HA-16, manufactured by Nihon Acryl K.K.) in an amount of 5 g/m² by means of a size press and dried using an air drier to make a filter medium. Characteristics and performance data of this medium is shown in Table 2.

EXAMPLE 7

The procedure of Example 6 was repeated except that basis weight of the Filtering Layer sheet was 30 g/m², and a filter medium was obtained.

EXAMPLE 8

The procedure of Example 6 was repeated except that the basis weight of the Filtering Layer sheet was 20 g/m² and the basis weight of the Support sheet was 50 g/m², and a filter medium was prepared.

EXAMPLE 9

The procedure of Example 6 was repeated except that the basis weight of the Filtering Layer sheet was 20 g/m² and the basis weight of the Support was 100 g/m², and a filter medium was prepared.

EXAMPLE 10

The procedure of Example 6 was repeated except that the basis weight of the Filtering Layer sheet was 20 g/m² and the fiber furnish for the Support was modified as shown in Table 2.

Table 2 shows characteristics and performance data of Examples 6-10.

EXAMPLES 11-15

Kevlar fine fibers (MFC-400, manufactured by Daicel Kagaku K.K.), ultra-fine acrylic fibers (manufactured by Mitsubishi Rayon K.K., 0.1 denier ×3 mm, about 3 μm in diameter) and thermobonding (sheath-core type) polyester fibers (Unitika Co., 4080, 2 denier ×5 mm, about 15 μm in diameter) were mixed to make a fiber stock slurry for the Filtering Layer fiber furnish as shown in Table 3. The resulting stock slurry was formed into a Filtering Layer sheet of a basis weight of 20 g/m² using a standard square type hand sheet former.

Polyester fibers of 0.5 denier ×5 mm (manufactured by Teijin K.K., about 7.2 μm in diameter), polyester fibers of 2 denier ×5 mm (manufactured by Teijin K.K., about 15 μm in diameter), vinylon fibers of 1 denier ×5 mm (manufactured by Kraray K.K., about 10 μm in diameter), and thermobonding (sheath-core type) polyester fibers (manufactured by Unitika Co., 2 denier ×5 mm, about 15 μm in diameter) were mixed to make a fiber stock slurry for the Support fiber furnish as shown in Table 3. The resulting stock slurry was formed into a Support sheet of a basis weight of 80 g/m² using a standard square type hand sheet former.

Said Filtering Layer sheet and Support sheet, while they were wet, were put together, and then pressed and dried to form a filter medium sheet. The resulting sheet was applied with an anionic acryl-latex (Primal HA-16, manufactured by Nihon Acryl K.K.) in an amount of 5 g/m² by means of a size press and dried using an air drier to make a filter medium. Characteristics and performance data of this medium is shown in Table 3.

COMPARATIVE EXAMPLES 1–3

Kevlar fine fibers (MFC-400, manufactured by Daicel Kagaku K.K.), ultra-fine polyester fibers (manufactured by Asahi Kasei K.K., 0.1 denier ×3 mm, about 3 μm in diameter), polyester fibers (manufactured by Teijin K.K., 0.5 denier ×5 mm, about 3 μm in diameter) and thermobonding (sheath-core type) polyester fibers (Unitika K.K., 4080, 2 denier ×5 mm, about 15 μm in diameter) were mixed to make a fiber stock slurry for the Filtering Layer fiber furnish as shown in Table 4. The resulting stock slurry was formed into a Filtering Layer sheet of a basis weight of 20 g/m² using a standard square type hand sheet former.

Unbeaten NBKP pulp (manufactured by Mitsubishi Paper Mills Ltd.), polyester fiber (manufactured by Teijin K.K., 12 denier ×10 mm, about 35 μm in diameter), and thermalbonding (sheath-core type) polyester fibers (manufactured by Unitika, 4080, 2 denier ×5 mm, about 15 μm in diameter) were mixed to make a fiber stock slurry for the Support fiber furnish as shown in Table 4. The resulting stock slurry was formed into a Support sheet of a basis weight of 80 g/m² using a standard square type hand sheet former.

Said Filtering Layer sheet and Support sheet, while they were wet, were put together, and then pressed and dried to form a filter medium sheet. The resulting sheet was applied with an anionic acryl-latex (Primal HA-16, manufactured by Nihon Acryl K.K.) in an amount of 5 g/m² by means of a size press and dried using an air drier to make filter mediums of Comparative Examples 1–3. Characteristics and performance data of these comparative example mediums are shown in Table 4.

COMPARATIVE EXAMPLE 4

The procedure of Example 6 was repeated except that the basis weight of the Filtering Layer was 4g/m², and a filter medium was obtained. Characteristics and performance data of this comparative example medium is shown in Table 4.

COMPARATIVE EXAMPLE 5

The procedure of Example 6 was repeated except that the basis weight of the Filtering Layer was 55 g/m², and a filter medium was obtained. Characteristics and performance data of this comparative example medium is shown in Table 4.

COMPARATIVE EXAMPLE 6

The procedure of Example 6 was repeated except that the basis weight of the Filtering Layer was 30 g/m² and same of the Support 25g/m², and a filter medium was obtained. Characteristics and performance data of this comparative example medium is shown in Table 5.

COMPARATIVE EXAMPLE 7

The procedure of Example 6 was repeated except that the basis weight of the Filtering Layer was 20 g/m² and same of the Support 160 g/m², and a filter medium was obtained. Characteristics and performance data of this comparative example medium is shown in Table 5.

COMPARATIVE EXAMPLE 8

Kevlar fine fibers (MFC-400, manufactured by Daicel Kagaku K.K..), ultra-fine polyester fibers (manufactured by Asahi Kasei K.K., 0.1 denier ×3 μm, about 3 pm in diamter), polyester fibers (manufactured by Teijin K.K., 0.5 denier ×5 Mm, about 7 μm in diameter), thermobonding (sheath-core type) polyester fibers (manufactured by Unitika Co., 4080, 2 denier ×5 mm, about 15 μm in diameter), unbeaten NBKP pulp (manufactured by Mitsubishi Paper Mills Ltd. ) and polyester fibers (manufactured by Teijin K.K., 12 denier ×10 mm, about 35 μm in diameter) were mixed at a weight ratio of 4:4:4:16:56:16 to form a fiber stock slurry. The resulting stock slurry was formed into a sheet of a basis weight of 100 g/m² using a standard square type hand sheet former, pressed and dried to form a filter medium sheet. The resulting sheet was applied with an anionic acryl-latex (Primal HA-16, manufactured by Nihon Acryl K.K.) in an amount of 5 g/m² by means of a size press and dried using an air drier to make a filter medium. Characteristics and performance data of this comparative example mediums are shown in Table 5.

COMPARATIVE EXAMPLE 9

A commercial liquid filter medium, "OA-800E" (single layered) manufactured by Awa Paper K.K. was employed as an example. Its characteristics and performance data is shown in Table 5.

COMPARATIVE EXAMPLE 10

An another commercial liquid filter medium, "AF-10W" (single layered) manufactured by Awa Paper K.K. was employed as an example. Its characteristics and performance data is shown in Table 5.

COMPARATIVE EXAMPLE 11–15

Kevlar fine fibers (MFC-400, manufactured by Daicel Kagaku K.K.), ultra-fine polyester fibers (manufactured by Asahi Kasei K.K., 0.1 denier ×3 mm, about 3 μm in diameter), ultra-fine acrylic fibers (manufactured by Mitsubishi Rayon K. K. , 0.1 denier 3 mm, about 3 μm in diameter), and thermobonding (sheath-core type) polyester fibers (manufactured by Unitika Co., 4080, 2 denier ×5 mm, about 15 μm in diameter) were mixed to make kinds of fiber stock slurry for the Filtering Layer fiber furnish as shown in Table 6. The resulting stock slurry was formed into a sheet of a basis weight of 20 g/m² using a standard square type hand sheet former. The resulting sheet alone, without being put together with a Support, was pressed, dried and treated with a thermal calender at 120° C. to form a filter sheet of a density of 0.5 g/cm³.

Characteristics and performance data of these examples are summarized in Table 6.

TABLE 1

| Example | 1 | 2 | 3 | 4 | 5 |
|---|---|---|---|---|---|
| Filtering Layer | | | | | |
| MFC - 400 | 10 | 30 | 10 | 10 | 20 |

TABLE 1-continued

| Example | 1 | 2 | 3 | 4 | 5 |
|---|---|---|---|---|---|
| 0.1 d × 3 mm PET | 20 | 20 | 10 | 60 | 30 |
| 0.5 d × 5 mm PET | 30 | 20 | 40 | — | — |
| 2 d × 5 mm PET (B) | 40 | 30 | 40 | 30 | 50 |
| Basis weight (g/m²) | 20 | 20 | 20 | 20 | 20 |
| Average pore size (μm) | 5.9 | 3.3 | 6.8 | 6.4 | 4.5 |
| Maximum pore size (μm) | 8.3 | 5.5 | 13.0 | 9.0 | 8.1 |
| Support | | | | | |
| N B K P | 70 | 70 | 70 | 70 | 70 |
| 12 d × 10 mm PET | 20 | 20 | 20 | 20 | 20 |
| 2 d × 5 mm PET (B) | 10 | 10 | 10 | 10 | 10 |
| Basis weight (g/m²) | 80 | 80 | 80 | 80 | 80 |
| Total basis weight (g/m²) | 105 | 105 | 105 | 105 | 105 |
| Strength | | | | | |
| Dry strength  MD | 8.0 | 8.0 | 8.1 | 8.0 | 8.2 |
| (kgf/15 mm)  CD | 4.6 | 4.5 | 4.6 | 4.5 | 4.6 |
| Wet strength  MD | 4.1 | 4.1 | 4.1 | 4.0 | 4.2 |
| (kgf/15 mm)  CD | 2.4 | 2.3 | 2.5 | 2.4 | 2.5 |
| Filter medium | | | | | |
| Average pore size (μm) | 4.7 | 2.6 | 5.6 | 5.1 | 3.7 |
| Maximum pore size (μm) | 7.5 | 5.0 | 11.0 | 8.1 | 7.3 |
| Initial filtration speed (cc/cm²·min) | 55.4 | 10.1 | 78.1 | 65.3 | 25.5 |
| Initial filtration efficiency (%) | 91 | 99 | 90 | 95 | 99 |
| Life: Filtration speed (cc/cm²·min) | 7.5 | 3.7 | 9.9 | 8.5 | 5.0 |
| Life: Filtration efficiency (%) | 94 | 99 | 93 | 95 | 99 |
| Pleating processability | ⊚ | ⊚ | ⊚ | ⊚ | ⊚ |

MD: Machine direction
CD: Cross machine direction
(In Tables 2–6, MD and CD are also as defined above.)

TABLE 2

| Example | 6 | 7 | 8 | 9 | 10 |
|---|---|---|---|---|---|
| Filtering Layer | | | | | |
| MFC - 400 | 20 | 20 | 20 | 20 | 20 |
| 0.1 d × 3 mm PET | 20 | 20 | 20 | 20 | 20 |
| 0.5 d × 5 mm PET | 20 | 20 | 20 | 20 | 20 |
| 2 d × 5 mm PET (B) | 40 | 40 | 40 | 40 | 40 |
| Basis weight (g/m²) | 10 | 30 | 20 | 20 | 20 |
| Average pore size (μm) | 7.0 | 4.3 | 4.8 | 3.9 | 5.1 |
| Maximum pore size (μm) | 13.9 | 6.7 | 7.9 | 6.3 | 9.2 |
| Support | | | | | |
| N B K P | 70 | 70 | 70 | 70 | 50 |
| 12 d × 10 mm PET | 20 | 20 | 20 | 20 | 20 |
| 2 d × 5 mm PET (B) | 10 | 10 | 10 | 10 | 30 |
| Basis weight (g/m²) | 80 | 80 | 50 | 100 | 80 |
| Total basis weight (g/m²) | 95 | 115 | 75 | 125 | 105 |
| Strength | | | | | |
| Dry strength  MD | 7.2 | 8.8 | 5.7 | 9.3 | 8.3 |
| (kgf/15 mm)  CD | 4.2 | 5.0 | 3.3 | 5.3 | 4.8 |
| Wet strength  MD | 3.6 | 4.5 | 3.1 | 4.6 | 4.2 |
| (kgf/15 mm)  CD | 2.1 | 2.5 | 1.7 | 2.6 | 2.5 |
| Filter medium | | | | | |
| Average pore size (μm) | 6.0 | 3.7 | 4.1 | 3.3 | 4.4 |
| Maximum pore size (μm) | 11.8 | 6.2 | 7.2 | 5.9 | 8.5 |
| Initial filtration speed (cc/cm²·min) | 93.2 | 12.4 | 40.5 | 21.7 | 46.2 |
| Initial filtration efficiency (%) | 94 | 99 | 97 | 98 | 97 |
| Life: Filtration speed (cc/cm²·min) | 10.8 | 5.0 | 6.1 | 10.4 | 7.2 |
| Life: Filtration efficiency (%) | 96 | 99 | 98 | 98 | 98 |
| Pleating processability | ⊚ | ⊚ | ⊚ | ⊚ | ⊚ |

TABLE 3

| Example | 11 | 12 | 13 | 14 | 15 |
|---|---|---|---|---|---|
| Filtering Layer | | | | | |
| MFC - 400 | 15 | 15 | 15 | 15 | 15 |
| 0.1 d × 3 mm acryl | 40 | 40 | 40 | 40 | 40 |
| 2 d × 5 mm PET (B) | 45 | 45 | 45 | 45 | 45 |
| Basis weight (g/m²) | 20 | 20 | 20 | 20 | 20 |
| Average pore size (μm) | 4.8 | 5.0 | 4.8 | 4.7 | 4.9 |
| Maximum pore size (μm) | 8.6 | 9.2 | 8.8 | 8.6 | 8.7 |
| Support | | | | | |
| 0.5 d × 5 mm PET | 20 | 20 | 20 | | 30 |
| 1 d × 5 mm Vinylon | 30 | 30 | 50 | 50 | |
| 2 d × 5 mm PET | | | | 20 | 20 |
| 2 d × 5 mm PET (B) | 50 | 50 | 30 | 30 | 50 |
| Basis weight (g/m²) | 40 | 80 | 40 | 40 | 40 |
| Total basis weight (g/m²) | 65 | 105 | 65 | 65 | 65 |
| Strength | | | | | |
| Dry strength  MD | 5.9 | 8.9 | 4.0 | 4.1 | 5.4 |
| (kgf/15 mm)  CD | 3.4 | 5.5 | 2.1 | 2.0 | 3.2 |
| Wet strength  MD | 4.0 | 5.6 | 2.9 | 3.0 | 3.8 |
| (kgf/15 mm)  CD | 2.2 | 3.0 | 1.8 | 1.9 | 2.2 |
| Filter medium | | | | | |
| Average pore size (μm) | 4.5 | 4.3 | 4.4 | 4.3 | 4.4 |
| Maximum pore size (μm) | 7.8 | 7.2 | 7.5 | 7.9 | 8.5 |
| Initial filtration speed (cc/cm²·min) | 93.2 | 12.4 | 40.5 | 21.7 | 46.2 |
| Initial filtration efficiency (%) | 94 | 99 | 97 | 98 | 97 |
| Life: Filtration speed (cc/cm²·min) | 10.8 | 5.0 | 6.1 | 10.4 | 7.2 |
| Life: Filtration efficiency (%) | 96 | 99 | 98 | 98 | 98 |
| Pleating processability | ⊚ | ⊚ | ○ | ○ | ⊚ |

TABLE 4

| Comparative Example | 1 | 2 | 3 | 4 | 5 |
|---|---|---|---|---|---|
| Filtering Layer | | | | | |
| MFC - 400 | 3 | 45 | 20 | 20 | 20 |
| 0.1 d × 3 mm PET | 72 | 15 | 3 | 20 | 20 |
| 0.5 d × 5 mm PET | — | — | 62 | 20 | 20 |
| 2 d × 5 mm PET (B) | 25 | 40 | 15 | 40 | 40 |
| Basis weight (g/m²) | 20 | 20 | 20 | 4 | 55 |
| Average pore size (μm) | 13.0 | 1.8 | 11.5 | 12.3 | 4.0 |
| Maximum pore size (μm) | 19.1 | 3.6 | 19.2 | 31.9 | 6.8 |
| Support | | | | | |
| NBKP | 70 | 70 | 70 | 70 | 70 |
| 12 d × 10 mm PET | 20 | 20 | 20 | 20 | 20 |
| 2 d × 5 mm PET (B) | 10 | 10 | 10 | 10 | 10 |
| Basis weight (g/m²) | 80 | 80 | 80 | 80 | 80 |
| Total basis weight (g/m²) | 105 | 105 | 105 | 89 | 140 |
| Strength | | | | | |
| Dry strength  MD | 7.5 | 8.8 | 7.3 | 7.0 | 10.4 |
| (kgf/15 mm)  CD | 3.9 | 5.1 | 3.7 | 4.1 | 5.9 |
| Wet strength  MD | 4.0 | 4.5 | 3.9 | 3.5 | 5.2 |
| (kgf/15 mm)  CD | 2.3 | 2.5 | 2.3 | 2.0 | 3.0 |
| Filter medium | | | | | |
| Average pore size (μm) | 11.7 | 1.6 | 10.9 | 11.1 | 3.6 |
| Maximum pore size (μm) | 25.1 | 3.3 | 18.3 | 30.5 | 6.6 |
| Initial filtration speed (cc/cm²·min) | 122.5 | 1.3 | 112.1 | 113.5 | 3.1 |
| Initial filtration efficiency (%) | 65 | 98 | 85 | 45 | 98 |
| Life: Filtration speed (cc/cm²·min) | 22.5 | 0.2 | 21.1 | 21.9 | 1.0 |
| Life: Filtration efficiency (%) | 85 | 99 | 88 | 78 | 98 |
| Pleating processability | ⊚ | ⊚ | ⊚ | ⊚ | ⊚ |

TABLE 5

| Comparative Example | 6 | 7 | 8 | 9 | 10 |
|---|---|---|---|---|---|
| Filtering Layer | | | | | |
| MFC - 400 | 20 | 20 | 4 | Awa Paper Mills OA-800E | Awa Paper Mills AF-10W |
| 0.1 d × 3 mm PET | 20 | 20 | 4 | | |
| 0.5 d × 5 mm PET | 20 | 20 | 4 | | |
| 2 d × 5 mm PET (B) | 40 | 40 | 16 | | |
| Basis weight (g/m²) | 30 | 20 | | | |
| Average pore size (μm) | 4.0 | 3.9 | | | |
| Maximum pore size (μm) | 7.3 | 6.8 | | | |
| Support | | | | | |

TABLE 5-continued

| Comparative Example | | 6 | 7 | 8 | 9 | 10 |
|---|---|---|---|---|---|---|
| NBKP | | 70 | 70 | 56 | | |
| 12 d × 10 mm PET | | 20 | 20 | 16 | | |
| 2 d × 5 mm PET (B) | | 10 | 10 | | | |
| Basis weight (g/m²) | | 25 | 160 | | | |
| Total basis weight (g/m²) | | 60 | 185 | 105 | 170 | 165 |
| Strength | | | | | | |
| Dry strength | MD | 5.7 | 13.7 | 9.0 | 11.1 | 12.8 |
| (kgf/15 mm) | CD | 3.4 | 7.8 | 5.3 | 5.3 | 9.3 |
| Wet strength | MD | 4.0 | 7.0 | 4.7 | 7.9 | 8.4 |
| (kgf/15 mm) | CD | 2.1 | 4.5 | 2.8 | 3.9 | 5.6 |
| Filter medium | | | | | | |
| Average pore size (μm) | | 3.5 | 3.6 | 16.5 | 24.5 | 12.5 |
| Maximum pore size (μm) | | 5.6 | 5.8 | 34.2 | 53.8 | 27.8 |
| Initial filtration speed (cc/cm² · min) | | 28.0 | 24.2 | 158.2 | 161.1 | 155.8 |
| Initial filtration efficiency (%) | | 98 | 98 | 60 | 42 | 53 |
| Life: Filtration speed (cc/cm² · min) | | 4.0 | 3.7 | 2.6 | 2.3 | 2.8 |
| Life: Filtration efficiency (%) | | 99 | 98 | 87 | 78 | 83 |
| Pleating processibility | | X | ⊚ | ⊚ | ⊚ | ⊚ |

TABLE 6

| Comparative Example | | 11 | 12 | 13 | 14 | 15 |
|---|---|---|---|---|---|---|
| Filtering Layer | | | | | | |
| MFC - 400 | | 15 | 15 | 15 | 15 | 15 |
| 0.1 d × 3 mm PET | | 15 | — | 25 | 35 | 65 |
| 0.1 d × 3 mm acryl | | — | 15 | — | — | — |
| 2 d × 5 mm PET (B) | | 70 | 70 | 60 | 50 | 20 |
| Basis weight (g/m²) | | 20 | 20 | 20 | 20 | 20 |
| Support | | none | none | none | none | none |
| Strength | | | | | | |
| Dry strength | MD | 2.0 | 2.0 | 1.8 | 1.6 | 0.8 |
| (kgf/15 mm) | CD | 1.4 | 1.4 | 1.3 | 1.1 | 0.5 |
| Wet strength | MD | 1.6 | 1.5 | 1.4 | 1.3 | 0.3 |
| (kgf/15 mm) | CD | 0.9 | 0.9 | 0.8 | 0.7 | 0.2 |
| Filter medium | | | | | | |
| Average pore size (μm) | | 6.8 | 7.0 | 3.5 | 3.2 | 2.8 |
| Maximum pore size (μm) | | 18.3 | 19.8 | 6.3 | 5.8 | 5.2 |
| Initial filtration speed (cc/cm² · min) | | 55.4 | 56.0 | 48.5 | 45.4 | 40.2 |
| Initial filtration efficiency (%) | | 91 | 91 | 97 | 98 | 98 |
| Life: Filtration speed (cc/cm² · min) | | 8.0 | 8.0 | 7.0 | 6.5 | 6.3 |
| Life: Filtration efficiency (%) | | 94 | 94 | 98 | 98 | 98 |
| Pleating processibility | | X | X | X | X | X |

As are clear from Examples 1–15 in Tables 1, 2 and 3, the filter mediums for liquid filtration of the present invention exhibited highly efficient filtration performance from the beginning of use, and the pores inside the filter sheet were not clogged with particles so that the life was long.

By integrating Filtering Layer and Support into a piece, there were produced filter mediums excellent in folding processibility which could not be obtained by making a filter medium of a Filtering Layers alone.

The filter medium of Comparative Example 1 is also a one of two-layered structure, but the initial filtration efficiency was low since only a small amount of Kevlar fine fibers (MFC-400) are contained in its Filtering Layer.

The filter medium of Comparative Example 2 is also a one of two-layered structure, but the initial filtration resistance was high and the filter life was short since content of Kevlar fine fiber (MFC-400) in its Filtering Layer was too high.

The filter medium of Comparative Example 3 is also a one of a two-layered structure, but the content of the ultra-fine organic fibers was low so that a large amount of Kevlar fibers (MFC-400) failed to be retained and flowed away from the fiber network of the Filtering Layer and caused clogging of its Support.

The filter medium of Comparative Example 4 is also one of a two-layered structure, but the basis weight of its Filtering Layer containing Kevlar fine fibers (MFC-400) is so low that the initial filtration efficiency dropped.

The filter medium of Comparative Example 5 is also a one of a two-layered structure, but the basis weight of its Filtering Layer containing Kevlar fine fibers (MFC-400) was so high that the initial filtration resistance was high and the filter life was short.

The filter medium of Comparative Example 6 is also a one of a two-layered structure, but the basis weight of its Support was so low that the folding processibility was poor.

The filter medium of Comparative Example 7 is also a one of a two-layered structure, but the basis weight of its Support was so high that despite its favourable filtering performance and folding processibility the number of fold per unit area, reflecting amount of the filter medium loadable to a filter unit as well, was limited resulting in a small filtering area per a filter unit. Moreover, such thick Support is not preferable from the stand point of costs.

The filter medium of Comparative Example 8 was one of a single layered structure, and therefore, the filtration performance was poor.

The filter medium of each of Comparative Examples 9–10 exhibited a low initial filtration resistance and excellent life, but its filtration efficiency low.

Each of the filter mediums of Comparative Examples 11–15 was one of a single layered structure, and exhibited filtration efficiency and life comparable with the Examples, but it was composed of only a thin Filtering Layer so that its stiffness was so low and processibility very poor.

What is claimed is:

1. A filter medium for liquid filtration which comprises: a filtering layer comprising 5–40% by weight of fibrillated organic fibers having a fiber diameter of 1 μm or less, 5–70% by weight of ultra-fine organic fibers having a fiber diameter of 1–5 μm, and 20–70% by weight of organic fibers having a fiber diameter of more than 5 μm, a part or all of the organic fibers having a fiber diameter of more than 5 μm being a fibrous organic binder, and having an average pore size of 1–10 μm and a basis weight of 5–50 g/m², and a support comprising organic fibers having a fiber diameter of 7 μm or more and a basis weight of 30–150 g/m², and the filtering layer and the support being integrated into a piece.

2. The filter medium for liquid filtration according to claim 1 in which the organic fibers of the support comprises at least one member selected from the group consisting of polyolefin, polyamide, polyester, acrylic and vinylon synthetic fibers.

3. The filter medium for liquid filtration according to claim 1 in which the fibrillated organic fibers having a fiber diameter of 1 mm or less of the filter sheet comprises at least one member selected from the group consisting of fibrillated Kevlar fibers, polyester pulps prepared by an alkali-amount-reducing and beating method, fiber-like fibrils prepared by fibrid method, fibrils prepared by a split method, fiber-like fibrils prepared by a polymer-blend dissolving method, and fiber-like fibrils prepared by flush spinning method.

4. The filter medium for liquid filtration according to claim 1, 2 or 3 in which the organic fibers of the support contains at least one member selected from the group consisting of polyester, polyolefin, and vinyl chloride-vinyl acetate copolymer fibrous organic binders in an amount of 10–60% by weight.

* * * * *